US009799020B2

(12) United States Patent
Howe et al.

(10) Patent No.: US 9,799,020 B2
(45) Date of Patent: Oct. 24, 2017

(54) METHOD FOR PROVIDING PAYMENT CARD SECURITY USING REGISTRATIONLESS TELECOM GEOLOCATION CAPTURE

(75) Inventors: Justin X. Howe, Larchmont, NY (US); Randall K. Shuken, Westport, CT (US)

(73) Assignee: Mastercard International Incorporated, Purchase, NY (US)

( * ) Notice: Subject to any disclaimer, the term of this patent is extended or adjusted under 35 U.S.C. 154(b) by 870 days.

(21) Appl. No.: 13/457,701

(22) Filed: Apr. 27, 2012

(65) Prior Publication Data
US 2013/0290119 A1 Oct. 31, 2013

(51) Int. Cl.
| | | |
|---|---|---|
| *G06Q 20/12* | (2012.01) | |
| *H04W 4/02* | (2009.01) | |
| *G06Q 20/20* | (2012.01) | |
| *G06Q 20/32* | (2012.01) | |
| *G06Q 20/34* | (2012.01) | |
| *G06Q 20/40* | (2012.01) | |

(52) U.S. Cl.
CPC ......... *G06Q 20/20* (2013.01); *G06Q 20/3224* (2013.01); *G06Q 20/34* (2013.01); *G06Q 20/401* (2013.01)

(58) Field of Classification Search
USPC ...................................... 705/16, 39; 455/410
See application file for complete search history.

(56) References Cited

U.S. PATENT DOCUMENTS

| | | | | |
|---|---|---|---|---|
| 8,521,131 | B1* | 8/2013 | Ramalingam | G06Q 20/10 455/410 |
| 2006/0085357 | A1* | 4/2006 | Pizarro | G06Q 20/10 705/64 |
| 2008/0301041 | A1* | 12/2008 | Bruk | G06Q 20/04 705/39 |
| 2011/0238514 | A1* | 9/2011 | Ramalingam | G06Q 20/10 705/21 |
| 2011/0238517 | A1* | 9/2011 | Ramalingam | G06Q 20/10 705/26.1 |
| 2012/0094639 | A1* | 4/2012 | Carlson | H04W 4/028 455/414.1 |
| 2013/0185166 | A1* | 7/2013 | Larkin | G06Q 20/20 705/21 |
| 2014/0358769 | A1* | 12/2014 | Howe | G06Q 20/12 705/39 |

* cited by examiner

*Primary Examiner* — Talia Crawley
(74) *Attorney, Agent, or Firm* — Budzyn IP Law, LLC

(57) ABSTRACT

A method for providing registrationless payment card security for a payment network that includes maintaining a list of anonymous mobile telephone numbers, which correspond to personal payment card account numbers (PAN). When a card-present authorization for a listed PAN is received, the payment network requests the geolocation of the cell phone of the card holder in real time from the mobile network operator. The mobile network operator determines the geolocation of the cell phone and transmits it to the payment network. The payment network compares the geolocation of the cell phone with the geolocation of the merchant to confirm that the card holder is present at the location of the transaction.

20 Claims, 2 Drawing Sheets

METHOD FOR PROVIDING PAYMENT CARD SECURITY USING REGISTRATIONLESS TELECOM GEOLOCATION CAPTURE

FIELD OF THE INVENTION

The present invention is a method for providing registrationless payment card security by identifying the location of a cardholder at the time of a payment card transaction. In particular, the present invention relates to a method for providing registrationless payment card security by comparing geolocation information provided by a cardholder's cell phone with the geolocation of the merchant in a payment card transaction.

BACKGROUND OF INVENTION

A survey conducted by the Federal Reserve Bank of Boston in 2010 reported that more than 600 million payment cards were held by U.S. consumers. As the number of payment cards has increased, the fraudulent use of stolen payment cards has also increased. Surveys have shown that the theft of payment card information is one of the greatest fears of consumers and in 2008 alone payment card fraud was estimated to be over $48 billion. Typically, merchants do not require a payment card user to provide identification and often a thief can use a stolen payment card to make purchases until the cardholder reports the theft to the payment card issuer. In the short time between the theft of a payment card and the report to the issuer, a thief can make purchases amounting to thousands of dollars.

Payment card issuers have implemented numerous programs in an attempt to minimize losses from the illegal use of stolen payment cards without inconveniencing consumers. Therefore, a threshold level of suspicious purchases must be identified before the payment card issuer blocks the use of a payment card. As a result, there is usually a time lag in payment card fraud prevention methods between the first unauthorized payment card transaction and when the issuer blocks the use of a payment card account. Shortening this time lag by early identification of fraudulent payment card transactions could save payment card issuers billions of dollars. Accordingly, there is a need for a method to provide payment card security by detecting fraudulent transactions before the cardholder realizes a payment card has been stolen and reports the theft to the payment card issuer, without requiring registration or data collection from the cardholder.

SUMMARY OF THE INVENTION

In accordance with the present invention, a method for providing registrationless payment card security is provided. The method includes: (1) compiling a first file in a database containing account information for a plurality of cardholder accounts, the account information for each cardholder account including a cardholder account number and transactions information, wherein the transactions information includes transaction timestamps, merchant geolocations and card presence data for each transaction; (2) programming the computer to search the first file and remove all cardholder accounts having fewer than ten transactions and create a plurality of filtered cardholder accounts; (3) compiling a second file in the database from the first file containing account information for the plurality of filtered cardholder accounts; (4) programming the computer to randomly generate unique user identification numbers or hashes corresponding to each of the account numbers in the second file; (5) compiling a third file in the database from the second file, wherein the cardholder account numbers in the account information for the plurality of filtered cardholder accounts is replaced by the unique user identification numbers; (6) transmitting the unique user identification numbers and the transactions information for each of the corresponding filtered cardholder accounts to a mobile network operator, wherein the mobile network operator compares the transaction timestamps and merchant geolocations for each transaction in each filtered cardholder account with historic geolocation information for cell phones operated by the mobile network operator and confirms to itself the identity of cell phones owned by cardholders of the filtered cardholder accounts, wherein the mobile network operator compiles a list of confirmed unique user identification numbers; (7) receiving the list of confirmed unique user identification numbers from the mobile network operator; (8) compiling a security file in the database for the confirmed unique user identification numbers, wherein the security file contains information for each confirmed unique user identification number, including the cardholder account number and the confirmed unique user identification number; (9) programming the computer to identify payment authorization requests for the cardholder accounts in the security file, wherein each payment authorization request includes transaction information; (10) sending a security query to the mobile network operator, wherein the security query includes the transaction information for the payment authorization request and the cardholder account's confirmed unique user identification number, and requests a real time geolocation of the cell phone corresponding to the confirmed unique user identification number without cardholder registration; (11) receiving the real time geolocation of the cell phone from the mobile network operator in response to the security query; (12) programming the computer to compare the point of sale geolocation for the payment authorization request with the real time geolocation of the corresponding cell phone provided by the mobile network operator to determine a distance between the point of sale geolocation and the geolocation of the corresponding cell phone; and (13) programming the computer to initiate a security alert when the distance is greater than a predetermined distance, preferably greater than one mile, more preferably greater than one-tenth of a mile.

The method can also include programming a computer to search the first file and remove all transactions when the card presence data shows that the card was not present at a point of sale or when the merchant data does not include geolocation data for a merchant prior to removing all cardholder accounts having fewer than ten transactions. The method can also include programming the computer to search the database and remove all transactions from the first file that are fraudulent or do not have timestamp data prior to removing all cardholder accounts having fewer than ten transactions.

The unique user identification numbers and the transactions information for each of the corresponding filtered cardholder accounts can be transmitted to the mobile network operator via a recordable medium or an electronic transmission, preferably via a T1 line or the internet. The security query to the mobile network operator and the response are transmitted via a high speed connection, preferably via a T1 line, the internet or a wireless transmission.

The mobile network operator preferably compares the transaction timestamps and merchant geolocations for each transaction in each filtered cardholder account with historic geolocation information for cell phones operated by the mobile network operator and confirms the identity of cell phones owned by cardholders of the filtered cardholder accounts using cumulative phone-transaction proximity where negating records counteract multiple matches, and proximity is inversely proportional to both phone density and transaction density independent of one another. A regression tree/forests, neural network or a machine learning algorithm can also be used. In addition, the payment card issuer can implement the method for providing payment card security in conjunction with more than one mobile network operator.

BRIEF DESCRIPTION OF THE FIGURES

The preferred embodiments of the method for providing payment card security of the present invention, as well as other objects, features and advantages of this invention, will be apparent from the accompanying drawings wherein.

DETAILED DESCRIPTION OF THE INVENTION

Figure 1:
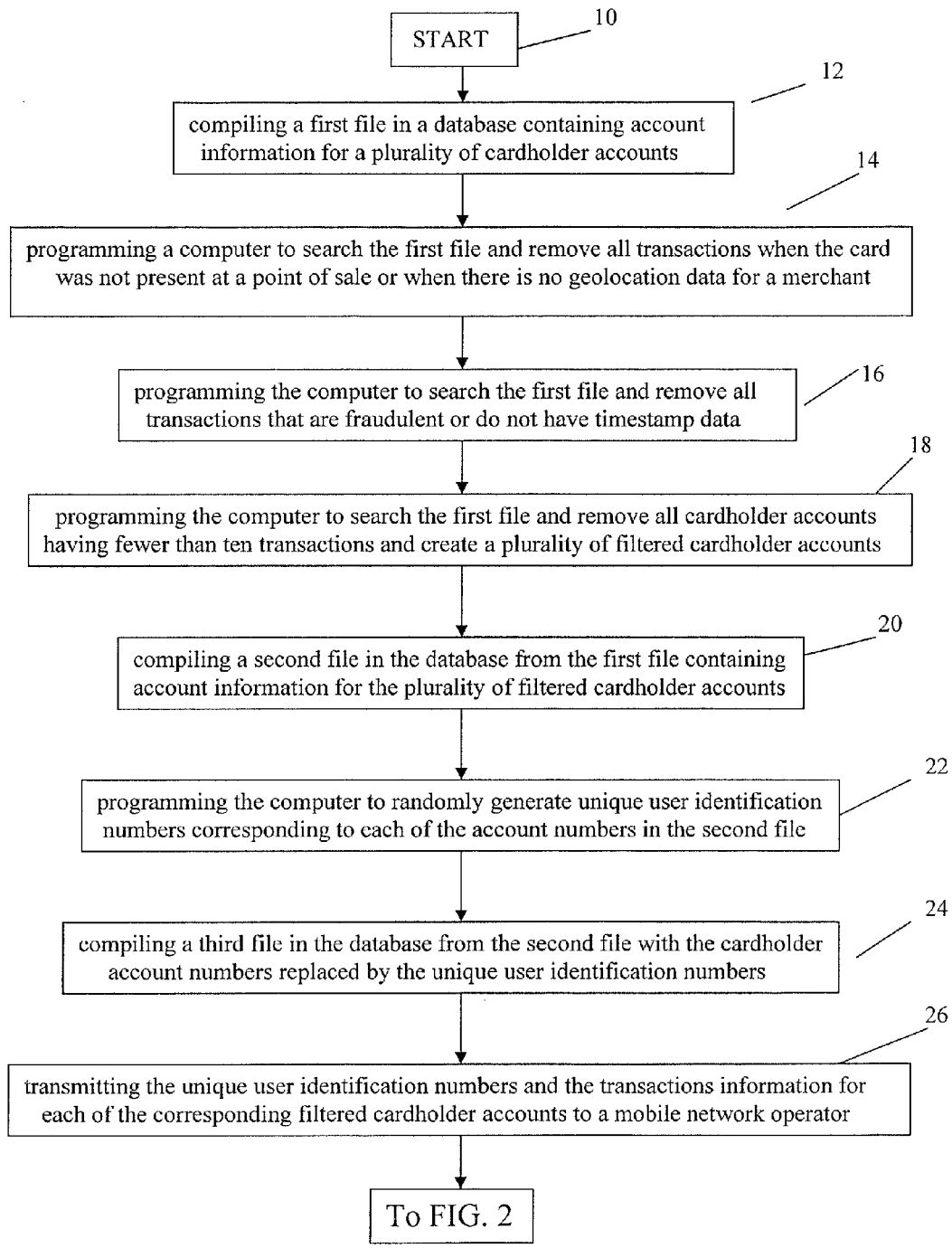
FIG. 1 is the first part of a flow chart showing a preferred embodiment of the method for providing payment card security.

The present invention is a method for providing payment card security by using transaction information to identify payment cardholders' cell phone without cardholder registration, while maintaining cardholder anonymity. The method uses the timestamps and the geolocations of a plurality of transactions made by a cardholder and compares them to the historic geolocations of all of the cell phones in a mobile phone network to identify a cardholder's cell phone. This avoids manual cardholder signup and the collection of phone numbers or other personal information from cardholders. This method also covers use of personal information-elements including but not limited to Social Security Number, phone number, name/address to avoid cardholder registration. The payment card issuer uses this information to approve a payment authorization request by contacting a mobile network operator and obtaining the real time location of a cardholder's cell phone. The payment card issuer then compares the location of the payment card transaction and the cardholder's cell phone to determine if the cardholder is the person making the transaction.

By implementing an anonymization routine, the system can be less intrusive on the cardholder while conferring all of the anti-fraud and operational security benefits. It also eliminates registration effort by the cardholders themselves. Since payment networks are interested primarily in preventing the unauthorized use of payment cards, they do not need to know the cardholder's cell phone number and the mobile network operator does not need to know the cardholder's account number. Accordingly, the payment network retains all personal payment card account information and only transmits a plurality of times and locations of payment card transactions, although the method also comprises the use of Social Security Number, phone number, name, address to avoid registration.

The cell phone number of a payment cardholder can be voluntarily provided when the cardholder submits an application for a new payment card or it can be obtained for existing cardholders though voluntary programs in alternative implementations. This can make it easy to identify a mobile phone that corresponds to a personal account number ("PAN"). However, payment card issuers do not have cell phone numbers for many payment cards accounts and cardholders often choose not to provide a cell phone number for a variety of reasons. This makes it more complicated to match mobile phones to PANs without using other personally identifiable information ("PII"), such as name or address. The payment card security system provides a method for monitoring card transactions while maximizing the anonymity of the cardholder by partnering with one or more mobile network operators for those operators to identify and maintain for themselves a list of the relevant cardholders' cell phone numbers.

To implement the payment card authorization system, the payments network of a payment card issuer maintains a list of identification numbers provided by the telephone company, which correspond to personal account numbers (PAN). When a card-present authorization for a listed PAN (also referred to herein as a payment card number) is received, the payment network forwards a real-time "geolocation pull request" to the mobile network operator of the unique identification number, which requests the geolocation of the cell phone of the cardholder in real time. The mobile network operator can provide the location of the cell phone to the payment network for comparison with the location of the transaction or the network mobile operator can determine the geolocation of the cell phone as against the unique identification number and transmits the geolocation as against the unique identification number to the payment network. The payment network, payment card issuer or mobile network operator compares the geolocation of the unique identification number with the geolocation of the merchant to confirm that the cardholder is in the proximity of the location of the transaction.

The mobile network operator can match the payment cardholders' account histories to the historic locations of cell phones in the network with the use of a distance metric, with allowances for differences in time. Other methods can also be used by one of ordinary skill in the art, such as a regression tree/forests, neural network or other machine learning algorithms, to match phones to cards using inputs including but not limited to geographic distance (aka great circle distance), temporal difference, card transaction density in the surrounding mile radius, phone density in the surrounding mile radius, time of day, payment channel (e.g., eCommerce or magstripe transactions), etc.

Mobile network operators have the capability to constantly identify and record the geolocations of cell phones in their network, even when the cell phones are not in use. Unfortunately, this is impractical due to the reduction of battery life and the over-exposure to cell phone radiation to the user that would be caused if the network operator continuously communicated with the cell phones. However, mobile network operators typically record the locations of all cell phones in the network at a predetermined time interval, e.g., every 5, 10 or 30 minutes. The time and geolocation of the cell phones at each interval is recorded and stored in a database. The payment card security system identifies cardholders' cell phones using the transaction information and the historic cell phone location records. The payment card issuer/payment network provides a plurality of anonymous locations to a mobile network operator, which uses the information to identify a unique identification number for a cardholder account. A cardholder's cell phone information can then be used with a payment card authorization system by comparing the geolocation of a cardholder's cell phone with the geolocation of a payment authorization request.

Definitions

The term "card presence data" refers to data recorded for a transaction, which indicates whether or not a payment card was presented to a merchant at the time of the transaction. A payment card is considered to be present at the time of a transaction when the cardholder swipes or scans the payment card at the point of sale or when the cardholder gives the payment card to the merchant and the merchant swipes or scans the card. A payment card is considered not to be present when the payment card is not swiped or scanned at the point of sale, e.g., when the transaction is made via the telephone or the internet.

The term "geolocation" or "geographic location" refers to the physical location of an object in the world, which may be described by longitude and latitude or by a more identifiable venue such as a city or street address. These terms are used interchangeably herein with the term "location."

The term "dummy-filled timestamp data" refers to a timestamp data entry that does not reflect the actual time of an event, but is made in order to prevent the field from being left empty. For example, when daily time is entered on a 2400 minute basis and the actual time is not available, dummy-filled data may be represented as XXXX or 9999.

The term "mobile network operator" refers to a cell phone carrier that offers mobile phone service. A mobile network operator can also be referred to as a wireless service provider, a cell phone company, a carrier service provider (CSP), a mobile phone operator, a wireless carrier or a mobile phone operator.

The term "cell phone" or "mobile phone" refers to a portable telephone that uses wireless cellular technology to send and receive phone signals. This technology works by dividing the Earth into small regions called cells. Within each cell the wireless telephone signal goes over its assigned bandwidth to a cell tower, which relays the signal to a telephone switching network, connecting the user to the desired party.

The term "T1 line" refers to a digital, high capacity, dedicated phone line for high speed data transmission.

The term "anonymize" means that the method for obtaining a cardholder's cell phone number is carried out or organized in such a way as to preserve the anonymity of the cardholder. While such anonymity may not be considered as sufficient under applicable law, it will serve to protect the privacy and security of each respective cardholder.

The term "registration less" means inclusion in the security system does not requiring sign-up, opt in, manual effort, or registration by the cardholder or phone owner.

The term "hash" means a cryptographic process whereby an input is converted into a unique value, via a process where the original value is unrecoverable from the unique value.

Description of the Payment Card Security System

Typically, a record of each payment card transaction is maintained by the payment card issuer and includes the time of the transaction. When the transaction occurs at a store or some other "brick and mortar" location (such as a gas station, restaurant or movie theater), the location of the merchant involved in the transaction is known to the payment card issuer. The payment card security method compiles all of the transactions for a payment card account and filters out those transactions that are not time stamped or where the payment card was not presented to the merchant at the time of the transaction, such as telephone and internet transactions. Fraudulent transactions and transactions with an unverified merchant geolocation are also filtered out. The remaining transactions in the account include information for a plurality of transactions with a timestamp and geolocation for each transaction. In order to increase the accuracy and the reliability of the payment card security method, a minimum number of transactions need to be compared to the historic cell phone location records. It has been found that satisfactory results are achieved when 10 or more transactions are analyzed, more preferably 20 or more transactions and most preferably 25 or more transactions.

After the payment card issuer filters and compiles the transactions for a plurality of cardholders' accounts, the account information can be stored in a file in a database. A second file can be created wherein a unique identification number is assigned to each cardholder account but does not include the cardholder's name, personal information or account number. The payment card issuer maintains a list of all of the account numbers and their corresponding unique identification numbers so that the cardholder accounts can be identified based on the unique identification number. This allows the transaction information with the unique identification numbers to be disseminated to third parties while maintaining the anonymity of the cardholder, i.e., not identifying the cardholder.

The information with the unique identification numbers can be copied onto an electronic storage medium or sent via a T1 line or as an encrypted attachment to an e-mail to a mobile network operator. The mobile network operator compares the time and location of each transaction for each account with the historic time-stamped location records of all of the cell phones in the network. The comparison identifies a cell phone that was within the proximity of a statistically significant number of transactions, preferably at least 80%, most preferably at least 90%, for a given payment card account within a predetermined window of time. The window of time is determined based on how frequently the mobile network operator records the location of the cell phones in the network. More frequent updates allow a smaller time window to be used because the location of the cell phone at the time of a transaction can be more accurately determined.

Similarly, the proximity of the cell phone to the geolocation of the merchant can vary based on how often the mobile network operator records the location of cell phones in the network. If the time interval between recordings of cell phone locations is short, the proximity of the cell phone to a transaction location can decrease. For example, if the cell phone location is recorded every 30 seconds, the proximity distance can be one-tenth of a mile or less. However, if the cell phone location is recorded every 5 minutes, the proximity distance can be 1 mile or preferably 2 miles. The difference in the proximity distance accounts for the movement by the cardholder after a transaction is completed. Longer intervals between the cell phone location updates provide more time for the cardholder to move away from the location of the transaction. A customer purchasing gas can travel several miles in only a few minutes.

A variety of different algorithms and methods can be used to compare the cardholder transaction information with the historic cell phone location records. For example, instance based comparisons, association rules, computational geometric methods, numerical methods, clustering, neural networks, machine learning, random forests, etc. Other methods for comparing data in one or more databases are well known to those skilled in the art. Such methods are disclosed in U.S. Pat. No. 7,223,234 to Stupp et al.; U.S. Pat. No.

6,741,738 to Taylor; and U.S. Pat. No. 7,461,037 to Hatonen et al., all of which are incorporated herein in their entirety. The comparison identifies cell phones that correspond to some of the unique identification numbers provided by the payment card issuer. However, all of the unique identification numbers will not have corresponding cell phone numbers for a variety of reasons. Most often, the cardholder uses a different mobile network operator. For all of the cell phones that can be identified, the mobile network operator prepares a list of confirmed unique identification numbers and transmits it to the payment card issuer.

The payment card issuer uses the confirmed unique identification numbers provided by the mobile network operator and matches them to payment card account numbers. These payment card accounts are then added to the payment card security system. When a payment authorization request for a payment card transaction, debit request or ATM request is received for any of these accounts, the payment card issuer, payment network or payment card acquirer sends a request to the mobile network operator to provide the real time location of the cell phone identified as belonging to the cardholder. When the payment card issuer receives the cell phone's real time location, the payment card issuer compares it to the location of the pending transaction. This comparison can also be done by the mobile network operator, payment network, payment card acquirer or the payment authorization network. If the cell phone is not in the proximity of the transaction, a security alert is initiated and the authorization request may be denied or some other action, such as the verification of the identity of the cardholder, can be taken.

There are many well known methods for identifying the real time location of a cell phone. Such methods are disclosed in U.S. Pat. No. 5,657,487 to Doner; U.S. Pat. No. 5,613,205 to Dufour; U.S. Pat. No. 6,122,512 to Bodin; U.S. Pat. No. 7,142,874 to Oleniczak; U.S. Pat. No. 6,064,885 to Rouhollahzadeh et al; and U.S. Pat. No. 7,529,236 to Kota et al., all of which are incorporated herein in their entirety. However, the scope of the method for providing payment card security is not limited in any way by the method that is used to determine the cell phone location. Depending on applicable law, cardholders will need to be notified of the security process by their issuer and/or mobile network operator. In certain cases, their specific consent may be needed to include their information in the relevant tables.

A preferred method for providing payment card security compiles a first file in a database containing account information for a plurality of cardholder accounts. The information for each account includes a cardholder account number and transactions information, including transaction timestamps, merchant geolocations and card presence data for each transaction. A computer can be programmed to search the first file and remove all transactions when the card presence data shows that the card was not present at a point of sale or when the merchant data does not include geolocation data for a merchant. This ensures that the cardholder was present during the transaction and the location of the merchant is identified. The computer can also be programmed to search the first file and remove all transactions that are fraudulent or do not have timestamp data. In the case of fraudulent transactions, it is assumed that the cardholder is not present and transactions without timestamps are removed because timestamp information is required to confirm the location of the payment card at an exact time.

The computer can also be programmed to search the first file and remove all cardholder accounts having fewer than ten transactions. In preferred embodiments, the computer can be programmed to remove cardholder accounts having fewer than 15 transactions and more preferably fewer than 20 transactions. The method compares the time and location of transactions with the location of cell phones at specific times. Therefore, the accuracy of the comparison is increased when more transactions are available for comparison. A plurality of filtered cardholder accounts is left in the first file after the accounts with fewer than the minimum number of transactions are removed.

A second file is compiled in the database that contains account information from the first file for the plurality of filtered cardholder accounts. The computer is programmed to randomly generate unique user identification numbers corresponding to each of the account numbers in the second file. A third file is then compiled in the database from the second file, wherein the cardholder account numbers in the account information for the plurality of filtered cardholder accounts is replaced by the unique user identification numbers. This ensures that minimal information regarding the cardholders is shared while at the same time it allows the payment card issuer to easily manage the information in the accounts. This helps to protect cardholders' privacy.

The unique user identification numbers and the transactions information for each of the corresponding filtered cardholder accounts is transmitted to a mobile network operator. The transmission can be via a recordable medium or an electronic transmission since there is no need to quickly transmit the information. The mobile network operator compares the transaction timestamps and merchant geolocations for each transaction in each filtered cardholder account with historic geolocation information for cell phones operated by the mobile network operator. Mobile network operators typically monitor the locations of all of the cellular devices in their network on an intermittent basis, e.g., every 5 minutes, and store the historic geolocation information on a database. The comparison can use one of several well known methods for comparing related information in two databases, as discussed above. The comparison, confirms the identity of cell phones owned by cardholders of the filtered cardholder accounts when it is determined that a cell phone was present at a statistically significant number of the payment card locations within a specified time and distance. Not all of the payment card accounts are matched with a cell phone for various reasons, e.g., the cardholder may use a different mobile network operator or the cardholder may not own a cell phone. For this reason, the method of the present invention preferably uses more than one mobile network operator. The mobile network operator compiles a list of unique user identification numbers that are confirmed to have a cell phone connected to the network of the mobile network operator.

In a preferred embodiment, the comparison uses a compound variable that may correspond to at least a pattern of occurrence of a first variable and a pattern of occurrence of a second variable. The determining may include contributions from presence and absence information in the pattern of occurrence of the compound variable. In some embodiments, the compound variable may correspond at least to a pattern of occurrence of a first variable during a first time set of intervals and a pattern of occurrence of a second variable during a second set of time intervals. The program module may include instructions for identifying the first variable and the second variable as the association variables in accordance with the first statistical relationship. The program module may include instructions for generating a plurality of compound variables and for determining one or more statistical relationships for the plurality of compound variables.

The respective compound variables correspond to patterns of occurrence in the two variables (geolocation and time) and the coincidence/proximity of their occurrence. The program module may include instructions for ranking the plurality of compound variables in accordance with the one or more statistical relationships. The program module may include instructions for ranking variables in the set of variables in accordance with a number of occurrences of the variables in the compound variables having respective statistical relationships that approximately exceed a statistical confidence threshold. The statistical confidence threshold may be selected such that at least a subset of the ranking is approximately stable. The determining may use a non-parametric statistical analysis technique, including a chi-square analysis technique, a log-likelihood ratio analysis technique, including support vector machines (SVM) analysis technique, a classification and regression tree (CART) analysis technique and/or a neural network analysis technique. The pattern of occurrence of the first variable and the pattern of occurrence of the second variable may comprise categorical data. A respective entry in the pattern of occurrence of the compound variable may be determined by performing a logical operation on corresponding entries in the pattern of occurrence of the first variable and the pattern of occurrence in the second variable. In some embodiments, the logical operation is a Boolean operation, including AND, OR, NOT, and/or XOR."

The payment card issuer receives the list of confirmed unique user identification numbers from the mobile network operator and uses the list to identify the cardholder account numbers that have a confirmed cell phone. The payment card issuer then compiles a security file in the database for the cardholder account numbers with confirmed unique user identification numbers. The security file contains information for each confirmed unique user identification number, including the cardholder account number and the confirmed unique user identification number.

The payment card issuer programs the computer to identify a payment authorization request for the cardholder accounts in the security file. Each payment authorization request includes transaction information, i.e., the time of the transaction and the geolocation of the merchant. When the payment card network, payment card issuer, or payment card acquirer receives a payment authorization request, payment debit request, or ATM request, it sends a security query to the mobile network operator via a high speed connection. The security query includes the transaction information for the payment authorization request and the cardholder account's confirmed unique user identification number and requests a real time geolocation of the cell phone corresponding to the confirmed unique user identification number. The mobile network operator identifies the cell phone corresponding to the confirmed unique user identification number and determines the real time geolocation of the cell phone. A variety of different methods can be used for determining the locations of cell phones. The real time geolocation of the cell phone is then sent by the mobile network operator via the high speed connection to the payment card issuer in response to the security query.

The payment card issuer uses the computer to compare the point of sale geolocation for the payment authorization request with the real time geolocation of the corresponding cell phone provided by the mobile network operator to determine a distance between the point of sale geolocation and the geolocation of the corresponding cell phone. This is a relatively simple operation that compares the time and location of the payment authorization request with the time and location of the cell phone to provide the difference in time and distance between the payment card transaction and the cell phone. If the distance exceeds a predetermined threshold value within a predetermined window of time, the computer initiates a security alert, e.g., when the distance is greater than one mile. The comparison can also be done by the mobile network operator or the payment authorization network.

In a preferred embodiment, the payment card security system can include a conventional computer server such as an "NT-Server," which is available from Microsoft Corp. of Redmond, Wash. or a "Unix Solaris Server" which can be provided by Sun Micro Systems of Palo Alto, Calif. These computer servers can be programmed with conventional web-page interface software, such as Visual Basic®, JAVA®, JAVASCRIPT®, HTML/DHTML, C++, J+, Perl™ or PERLSCRIPT®, or ASP.

The system can also include a processor, associated memory, a non-volatile storage medium, such as a magnetic or optical disk drive, operating system, database management server, web server software, web application, computer network interface and mass storage device manger. The payment card security system can access one or more databases having payment card account information stored therein. The databases can include a disk drive, a disk drive array, tape drive, tape library system, optical disk drive, or optical disk drive array. Generally, the system includes hardware necessary for running software which: (1) authenticates and breaks down requests for information; (2) determines the locations of databases storing the requested information; (3) extracts information from databases based on requests; (4) merges extracted information extracted from various databases; (5) transforms and scrubs merged information; (6) compares information to historic information; and (7) formats the requested information into a user-defined format. In some preferred embodiments, the World Wide Web server and the World Wide Web application include software running on the computer system, which supports the World Wide Web protocol for providing data between the payment card issuer's computer and one or more databases which contain information, including the mobile network operator's computer system.

Figure 2:
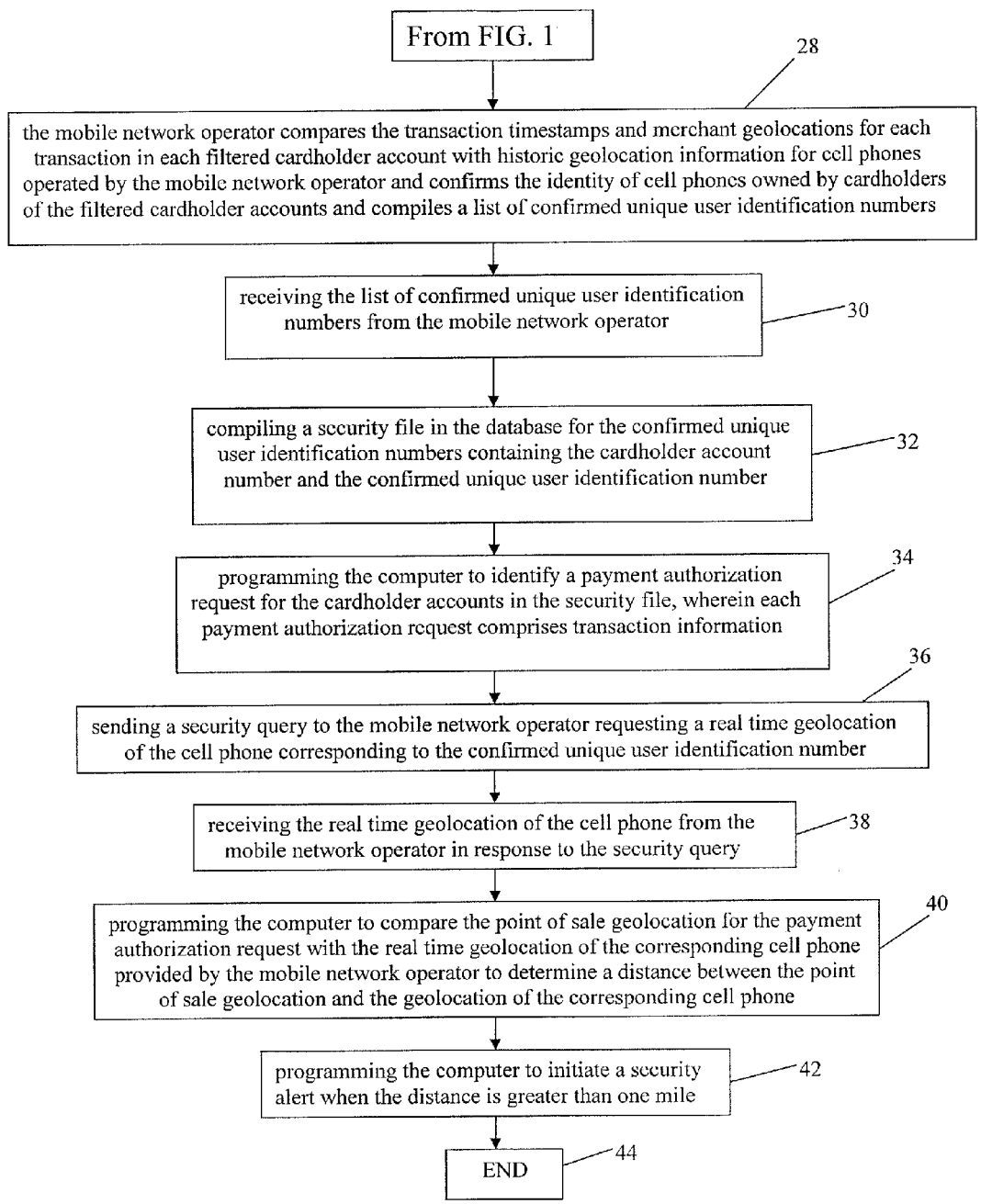
FIG. 2 is the second part of the flow chart that begins on FIG. 1 and shows a preferred embodiment of the method for providing payment card security.

A preferred embodiment of the method for providing payment card security is shown in FIGS. 1 and 2, which is a flow chart showing the steps of the method. FIG. 1 shows the start 10 of the method. The first step 12 is compiling a first file in a database containing account information for a plurality of cardholder accounts. The second step 14 is programming a computer to search the first file and remove all transactions when the card was not present at a point of sale or when there is no geolocation data for a merchant. The third step 16 is programming the computer to search the first file and remove all transactions that are fraudulent or do not have timestamp data. The fourth step 18 is programming the computer to search the first file and remove all cardholder accounts having fewer than ten transactions and create a plurality of filtered cardholder accounts. The fifth step 20 is compiling a second file in the database from the first file containing account information for the plurality of filtered cardholder accounts. The sixth step 22 is programming the computer to randomly generate unique user identification numbers corresponding to each of the account numbers in the second file. The seventh step 24 is compiling a third file in the database from the second file with the cardholder account numbers replaced by the unique user identification numbers. The eighth step 26 is transmitting the unique user identification numbers and the transactions information for each of the corresponding filtered cardholder accounts to a mobile network operator.

The flow chart continues in FIG. 2 with the ninth step 28, wherein the mobile network operator compares the transaction timestamps and merchant geolocations for each transaction in each filtered cardholder account with historic geolocation information for cell phones operated by the mobile network operator and confirms the identity of cell phones owned by cardholders of the filtered cardholder accounts and compiles a list of confirmed unique user identification numbers. The tenth step 30 is receiving the list of confirmed unique user identification numbers from the mobile network operator. The eleventh step 32 is compiling a security file in the database for the confirmed unique user identification numbers containing the cardholder account number and the confirmed unique user identification number. The twelfth step 34 is programming the computer to identify a payment authorization request for the cardholder accounts in the security file, wherein each payment authorization request comprises transaction information. The thirteenth step 36 is sending a security query to the mobile network operator requesting a real time geolocation of the cell phone corresponding to the confirmed unique user identification number. The fourteenth step 38 is receiving the real time geolocation of the cell phone from the mobile network operator in response to the security query. The fifteenth step 40 is programming the computer to compare the point of sale geolocation for the payment authorization request with the real time geolocation of the corresponding cell phone provided by the mobile network operator to determine a distance between the point of sale geolocation and the geolocation of the corresponding cell phone. And the sixteenth step 42 is programming the computer to initiate a security alert when the distance is greater than one mile. The program then ends 44.

EXAMPLES

The example set forth below serves to provide further appreciation of the invention but is not meant in any way to restrict the scope of the invention.

Example 1

A preferred distance metric that can be used for the payment card security system includes the following steps:

1. A 'Votes' table is created of phone and card combinations.

|  | Card 1 | Card 2 | Card 3 | Card 4 | Card 5 | Card 6 |
|---|---|---|---|---|---|---|
| Phone A |  |  |  |  |  |  |
| Phone B |  |  |  |  |  |  |
| Phone C |  |  |  |  |  |  |
| Phone D |  |  |  |  |  |  |
| Phone E |  |  |  |  |  |  |
| Phone F |  |  |  |  |  |  |
| Phone G |  |  |  |  |  |  |

2. For each transaction, a vote weight is determined using the following equation, provided the existence of geolocations obtained for both the phone and transaction within a 30 minute time difference (note, only the phone geolocation closest in time to the transaction is to be used in voting):

$$\text{Transaction Vote Weighting} = e^{\frac{-|t_t - t_p|}{\varepsilon}|\Delta|}\sqrt{\frac{1}{D_p}}\sqrt{\frac{1}{D_t}} - \beta$$

$t_t$=transaction time in minutes
$t_p$=phone location capture time closest to $t_t$
$D_p$=number of phones in a 1-mile radius of the transaction location in a one hour period before the transaction
$D_t$=number of transactions in a 1-mile radius of the transaction location in that 1 hour period
$g_t$=latitude and longitude of the transaction location
$g_p$=latitude and longitude of the phone location
$\Delta$=distance between $g_p$ and $g_t$ (in miles) using the great circle distance, or using the haversine formula if the distance is less than 1 mile.

$\beta=-10$ if $\Delta>50$ $\beta=0$ if $\Delta\leq50$

As used herein the term "the haversine formula" refers to an equation used in navigation, which gives great-circle distances between two points on a sphere from their longitudes and latitudes.

3. For the first transaction a weight is calculated for each phone and entered in the appropriate column of the 'Votes' table shown below.

| Votes Table for Transaction 1 | | | | | | |
|---|---|---|---|---|---|---|
|  | Card 1 | Card 2 | Card 3 | Card 4 | Card 5 | Card 6 |
| Phone A | −10 |  |  |  |  |  |
| Phone B | −10 |  |  |  |  |  |
| Phone C | −10 |  |  |  |  |  |
| Phone D | 1 |  |  |  |  |  |
| Phone E | 1 |  |  |  |  |  |
| Phone F | −10 |  |  |  |  |  |
| Phone G | −10 |  |  |  |  |  |

4. The second transaction (from a different card) determines the weights of votes for each phone, and is entered in the appropriate column of the 'Votes' table.

| Votes Table for Transaction 2 | | | | | | |
|---|---|---|---|---|---|---|
|  | Card 1 | Card 2 | Card 3 | Card 4 | Card 5 | Card 6 |
| Phone A | −10 | −10 |  |  |  |  |
| Phone B | −10 | −10 |  |  |  |  |
| Phone C | −10 | −10 |  |  |  |  |
| Phone D | 1 | −10 |  |  |  |  |
| Phone E | 1 | −10 |  |  |  |  |
| Phone F | −10 | −10 |  |  |  |  |
| Phone G | −10 | −10 |  |  |  |  |

5. The third transaction comes from the first card, so the votes from this transaction are added to the cumulative total already in the first column.

| Votes Table for Transaction 3 | | | | | | |
|---|---|---|---|---|---|---|
|  | Card 1 | Card 2 | Card 3 | Card 4 | Card 5 | Card 6 |
| Phone A | −9 | −10 |  |  |  |  |
| Phone B | −9 | −10 |  |  |  |  |
| Phone C | −20 | −10 |  |  |  |  |
| Phone D | 1 | −10 |  |  |  |  |

-continued

Votes Table for Transaction 3

|  | Card 1 | Card 2 | Card 3 | Card 4 | Card 5 | Card 6 |
| --- | --- | --- | --- | --- | --- | --- |
| Phone E | 1 | −10 |  |  |  |  |
| Phone F | −20 | −10 |  |  |  |  |
| Phone G | −20 | −10 |  |  |  |  |

Note, the values for phones D and E are unchanged. There can be a variety of reasons for this, including: the phone was turned off at that time; the user was out of the country at that time, the phone was underground at that time, or the equation can provide a result very close to zero when the phone is a substantial distance away from the transaction, e.g., the transaction Vote weighting is essentially zero when the distance is over 40 miles.

6. This process continues until the votes from every transaction have been added to the 'Votes' table.

7. At this point, the phone/card pair with the highest vote count is entered in a new 'Links' table of phone/card linkages.

New 'Links' Table of Phone/Card Linkages

| Card | Phone | Votes | Multiple Cards per Phone? |
| --- | --- | --- | --- |
| Card 19 | Phone C | 500 | No |
| Card 802 | Phone G | 420 | No |
| Card 33 | Phone Q | 389 | Yes |
| Card 182 | Phone PP | 378 | No |

This process is repeated (in descending order of vote totals) until there are no more phone records with positive cumulative vote totals. A phone/card pair with a negative cumulative vote total is not to be entered in the 'Links' table.

8. The 'Link's table has now matched cards to phones in an anonymized fashion with high confidence.

9. To test the accuracy of the 'Link' table, the payment network can notify the telecom operator in real time to learn the exact location of the linked phone when the next transaction comes in on that card. If the phone and card geolocations are within 100 meters, the link is labeled 'Validated' in the 'Links' table.

Thus, while there have been described the preferred embodiments of the present invention, those skilled in the art will realize that other embodiments can be made without departing from the spirit of the invention, and it is intended to include all such further modifications and changes as collie within the true scope of the claims set forth herein.

We claim:

1. A method for providing registrationless payment card security without disclosing a cardholder's personal information, the method comprising:

programming a computer to (1) search a first file in a database containing account information for a plurality of cardholder accounts, the account information for each cardholder account comprising a cardholder account number and transactions information, wherein the transactions information comprises transaction timestamps, merchant geolocations and card presence data for each transaction, (2) remove all cardholder accounts having fewer than ten transactions and create a plurality of filtered cardholder accounts and (3) compile a second file in the database from the first file containing account information for the plurality of filtered cardholder accounts;

programming the computer to randomly generate unique user identification numbers or hashes corresponding to each of the account numbers in the second file;

compiling a third file in the database from the second file, wherein the cardholder account numbers in the account information for the plurality of filtered cardholder accounts is replaced by the unique user identification numbers, and wherein no personal cardholder information is contained in the third file and the cardholder is not identified;

transmitting the unique user identification numbers and the transactions information for each of the corresponding filtered cardholder accounts to a mobile network operator, wherein the mobile network operator compares the transaction timestamps and merchant geolocations for each transaction in each filtered cardholder account with historic geolocation information for cell phones operated by the mobile network operator and confirms to itself the identity of cell phones owned by cardholders of the filtered cardholder accounts, wherein the mobile network operator compiles a list of confirmed unique user identification numbers;

receiving the list of confirmed unique user identification numbers from the mobile network operator;

compiling a security file in the database for the confirmed unique user identification numbers, wherein the security file contains information for each confirmed unique user identification number, the information comprising the cardholder account number and the confirmed unique user identification number;

programming the computer to identify payment authorization requests for the cardholder accounts in the security file, wherein each payment authorization request comprises transaction information;

sending a security query to the mobile network operator, the security query comprising the transaction information for the payment authorization request and the cardholder account's confirmed unique user identification number, the security query requesting a real time geolocation of the cell phone corresponding to the confirmed unique user identification number;

receiving the real time geolocation of the cell phone from the mobile network operator in response to the security query;

programming the computer to compare the point of sale geolocation for the payment authorization request with the real time geolocation of the corresponding cell phone provided by the mobile network operator to determine a distance between the point of sale geolocation and the geolocation of the corresponding cell phone; and programming the computer to initiate a security alert when the distance is greater than a predetermined distance.

2. The method for providing payment card security according to claim 1 further comprising programming a computer to search the first file and remove all transactions when the card presence data shows that the card was not present at a point of sale or when the merchant data does not include geolocation data for a merchant.

3. The method for providing payment card security according to claim 1 further comprising programming the computer to search the database and remove all transactions from the first file that are fraudulent or do not have timestamp data.

4. The method for providing payment card security according to claim 1, wherein the computer is programmed to initiate a security alert when the distance is greater than one mile.

5. The method for providing payment card security according to claim 1, wherein the unique user identification numbers and the transactions information for each of the corresponding filtered cardholder accounts is transmitted to the mobile network operator via a recordable medium or an electronic transmission.

6. The method for providing payment card security according to claim 1, wherein the unique user identification numbers and the transactions information for each of the corresponding filtered cardholder accounts is transmitted to the mobile network operator via a T1 line or the internet.

7. The method for providing payment card security according to claim 1, wherein the security query to the mobile network operator and the response are transmitted via a high speed connection.

8. The method for providing payment card security according to claim 1, wherein the high speed connection is a T1 line, the internet or a wireless transmission.

9. The method for providing payment card security according to claim 1, wherein the mobile network operator compares the transaction timestamps and merchant geolocations for each transaction in each filtered cardholder account with historic geolocation information for cell phones operated by the mobile network operator and confirms the identity of cell phones owned by cardholders of the filtered cardholder accounts using cumulative phone-transaction proximity where negating records counteract multiple matches, and proximity is inversely proportional to both phone density and transaction density independent of one another.

10. The method for providing payment card security according to claim 1, wherein the mobile network operator compares the transaction timestamps and merchant geolocations for each transaction in each filtered cardholder account with historic geolocation information for cell phones operated by the mobile network operator and confirms the identity of cell phones owned by cardholders of the filtered cardholder accounts using a regression tree/forests, neural network or a machine learning algorithm.

11. A method for providing payment card security without disclosing a cardholder's personal information, the method comprising:
  programming a computer to (1) search a first file in a database containing account information for a plurality of cardholder accounts, the account information for each cardholder account comprising a cardholder account number and transactions information, wherein the transactions information comprises transaction timestamps, merchant geolocations and card presence data for each transaction, (2) remove all cardholder accounts having fewer than ten transactions and create a plurality of filtered cardholder accounts and (3) compile a second file in the database from the first file containing account information for the plurality of filtered cardholder accounts;
  programming the computer to randomly generate unique user identification numbers corresponding to each of the account numbers in the second file;
  compiling a third file in the database from the second file, wherein the cardholder account numbers in the account information for the plurality of filtered cardholder accounts is replaced by the unique user identification numbers, and wherein no personal cardholder information is contained in the third file and the cardholder is not identified;
  transmitting the unique user identification numbers and the transactions information for each of the corresponding filtered cardholder accounts to one or more mobile network operators, wherein each of the mobile network operators compares the transaction timestamps and merchant geolocations for each transaction in each filtered cardholder account with historic geolocation information for cell phones operated by the mobile network operator and confirms to itself the identity of cell phones owned by cardholders of the filtered cardholder accounts, wherein each of the one or more mobile network operators compiles a list of confirmed unique user identification numbers;
  receiving the list of confirmed unique user identification numbers from each of the one or more mobile network operators;
  compiling a security file in the database for the confirmed unique user identification numbers, wherein the security file contains information for each confirmed unique user identification number, the information comprising the cardholder account number, the confirmed unique user identification number and the mobile network operator that provided the confirmed unique user identification number;
  programming the computer to identify payment authorization requests for the cardholder accounts in the security file, wherein each payment authorization request comprises transaction information;
  sending a security query to the mobile network operator that provided the confirmed unique user identification number, the security query comprising the transaction information for the payment authorization request and the cardholder account's confirmed unique user identification number, the security query requesting a real time geolocation of the cell phone corresponding to the confirmed unique user identification number;
  receiving the real time geolocation of the cell phone from the mobile network operator in response to the security query;
  programming the computer to compare the point of sale geolocation for the payment authorization request with the real time geolocation of the corresponding cell phone provided by the mobile network operator to determine a distance between the point of sale geolocation and the geolocation of the corresponding cell phone; and
  programming the computer to initiate a security alert when the distance is greater than a predetermined distance.

12. The method for providing payment card security according to claim 11 further comprising programming a computer to search the first file and remove all transactions when the card presence data shows that the card was not present at a point of sale or when the merchant data does not include geolocation data for a merchant.

13. The method for providing payment card security according to claim 11 further comprising programming the computer to search the database and remove all transactions from the first file that are fraudulent or do not have timestamp data.

14. The method for providing payment card security according to claim 11, wherein the computer is programmed to initiate a security alert when the distance is greater than a predetermined distance.

15. The method for providing payment card security according to claim 11, wherein the unique user identification numbers and the transactions information for each of the corresponding filtered cardholder accounts is transmitted to each of the one or more mobile network operators via a recordable medium or an electronic transmission.

16. The method for providing payment card security according to claim 11, wherein the unique user identification numbers and the transactions information for each of the corresponding filtered cardholder accounts is transmitted to each of the one or more mobile network operators via a T1 line, the internet or a wireless signal.

17. The method for providing payment card security according to claim 1, wherein the security query to the mobile network operator and the response are transmitted via a high speed connection.

18. The method for providing payment card security according to claim 11, wherein the high speed connection is a T1 line, the internet or a wireless transmission.

19. A method for providing payment card security without disclosing a cardholder's personal information, the method comprising:
programming a computer to (1) search a first file in a database containing account information for a plurality of cardholder accounts, the account information for each cardholder account comprising a cardholder account number and transactions information, wherein the transactions information comprises transaction timestamps, merchant geolocations and card presence data for each transaction, (2) remove all transactions from the first file when the card presence data shows that the card was not present at a point of sale or when the merchant data does not include geolocation data for a merchant, (3) remove all transactions that are fraudulent or do not have timestamp data and (4) remove all cardholder accounts having fewer than ten transactions and create a plurality of filtered cardholder accounts;
compiling a second file in the database from the first file containing account information for the plurality of filtered cardholder accounts;
programming the computer to randomly generate unique user identification numbers corresponding to each of the account numbers in the second file;
compiling a third file in the database from the second file, wherein the cardholder account numbers in the account information for the plurality of filtered cardholder accounts is replaced by the unique user identification numbers, and wherein no personal cardholder information is contained in the third file and the cardholder is not identified;
transmitting the unique user identification numbers and the transactions information for each of the corresponding filtered cardholder accounts via a recordable medium or an electronic transmission to a mobile network operator, wherein the mobile network operator compares the transaction timestamps and merchant geolocations for each transaction in each filtered cardholder account with historic geolocation information for cell phones operated by the mobile network operator and confirms to itself the identity of cell phones owned by cardholders of the filtered cardholder accounts, wherein the mobile network operator compiles a list of confirmed unique user identification numbers;
receiving the list of confirmed unique user identification numbers from the mobile network operator;
compiling a security file in the database for the confirmed unique user identification numbers, wherein the security file contains information for each confirmed unique user identification number, the information comprising the cardholder account number and the confirmed unique user identification number;
programming the computer to identify a payment authorization request for the cardholder accounts in the security file, wherein each payment authorization request comprises transaction information;
sending a security query to the mobile network operator via a high speed connection, the security query comprising the transaction information for the payment authorization request and the cardholder account's confirmed unique user identification number, the security query requesting a real time geolocation of the cell phone corresponding to the confirmed unique user identification number;
receiving the real time geolocation of the cell phone via the high speed connection from the mobile network operator in response to the security query;
programming the computer to compare the point of sale geolocation for the payment authorization request with the real time geolocation of the corresponding cell phone provided by the mobile network operator to determine a distance between the point of sale geolocation and the geolocation of the corresponding cell phone; and
programming the computer to initiate a security alert when the distance is greater than a predetermined distance.

20. The method for providing payment card security according to claim 19, wherein the security query to the mobile network operator and the response are transmitted via a T1 line, the internet or a wireless transmission.

* * * * *